United States Patent
Goto (10) Patent No.: US 7,046,028 B2
(45) Date of Patent: May 16, 2006

(54) METHOD OF INSPECTING A SEMICONDUCTOR DYNAMIC QUANTITY SENSOR

(75) Inventor: Keisuke Goto, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/052,049

(22) Filed: Feb. 8, 2005

(65) Prior Publication Data

US 2005/0179440 A1    Aug. 18, 2005

(30) Foreign Application Priority Data

Feb. 13, 2004   (JP)   ............................. 2004-036439

(51) Int. Cl.
G01R 31/26   (2006.01)

(52) U.S. Cl. ...................................... 324/765; 324/763
(58) Field of Classification Search ................ 257/420; 438/52; 324/765
See application file for complete search history.

(56) References Cited

U.S. PATENT DOCUMENTS

| 6,151,966 | A | 11/2000 | Sakai et al. | |
| 6,841,840 | B1* | 1/2005 | Sakai | .......................... 257/420 |
| 2005/0062067 | A1* | 3/2005 | Kunda et al. | ................. 257/202 |
| 2005/0205949 | A1* | 9/2005 | Tokunaga | .................... 257/415 |

* cited by examiner

Primary Examiner—Vinh Nguyen
Assistant Examiner—Arleen M. Vazquez
(74) Attorney, Agent, or Firm—Posz Law Group, PLC

(57) ABSTRACT

A method of inspecting a semiconductor dynamic quantity includes varying a potential applied to a peripheral fixed portion while applying predetermined potentials to fixed electrodes and to movable electrodes to vary the potential difference between the movable electrodes and the support substrate and to displace the movable electrodes in a direction perpendicular to the surface of the substrate.

3 Claims, 6 Drawing Sheets

METHOD OF INSPECTING A SEMICONDUCTOR DYNAMIC QUANTITY SENSOR

CROSS REFERENCE TO RELATED APPLICATION

This application is based upon, claims the benefit of priority of, and incorporates by reference the contents of, Japanese Patent Application No. 2004-36439 filed on Feb. 13, 2004.

FIELD OF THE INVENTION

This invention relates to a method of inspecting a semiconductor dynamic quantity sensor that detects the dynamic quantity based on a change in the distance among the movable electrodes and the fixed electrodes.

BACKGROUND OF THE INVENTION

A semiconductor dynamic quantity sensor such as that disclosed in, for example, JP-A-11-326365, is a differential capacitance type comprising first fixed electrodes and second fixed electrodes opposed to movable electrodes, to detect an applied dynamic quantity based on a change in the differential capacitance between a capacitance by the movable electrodes and first fixed electrodes and a capacitance by the movable electrodes and second fixed electrodes, that accompany the displacement of the movable electrodes when the dynamic quantity is applied.

In this semiconductor dynamic quantity sensor, a silicon substrate on the lower side of an SOI (silicon-on-insulator) is used as a support substrate, and trenches are formed in the silicon substrate on the upper side by trench etching to thereby form movable electrodes and fixed electrodes as well as peripheral fixed portions for the electrodes.

More fully, the semiconductor dynamic quantity sensor of the differential capacitance type comprises a peripheral fixed portion fixed and supported on the support substrate along the peripheral portion of the support substrate, movable electrodes supported on the support substrate on the inside of the peripheral fixed portion and displaceable in a horizontal direction relative to the substrate surface, and first fixed electrodes and second fixed electrodes fixed and supported on the support substrate on the inside of the peripheral fixed portion and that are opposed to the movable electrodes via a detection gap.

A first capacitance CS1 is formed between the movable electrodes and the first fixed electrodes, and a second capacitance CS2 is formed between the movable electrodes and the second fixed electrodes, to detect the applied dynamic quantity based on a change in the differential capacitance between the first capacitance CS1 and the second capacitance CS2, that accompanies the displacement of the movable electrodes when the dynamic quantity is applied.

Therefore, the semiconductor dynamic quantity sensor of this kind is inspected to determine if the detector capacitance portion between the movable electrodes and the fixed electrodes is normally working.

Namely, the movable electrodes undergo the displacement in a horizontal direction relative to the surface of the substrate upon the application of a dynamic quantity, whereby the distance varies between the movable electrodes and the fixed electrodes accompanying the displacement and, therefore, the capacitance varies. Here, when a given dynamic quantity is applied, it is inspected to determine if a desired change in the capacitance is obtained.

Here, in the above semiconductor dynamic quantity sensor in which the movable electrodes are provided on the support substrate so as to be opposed thereto in a separated manner, it is necessary to perform an inspection to determine if the movable electrodes are normally displacing in a direction perpendicular to the surface of the substrate accompanying the application of a dynamic quantity.

If, for example, a foreign matter exists between the movable electrodes and the support substrate, the movable electrodes displace in the direction of the support substrate upon the application of a dynamic quantity in a direction perpendicular to the surface of the substrate, and come into contact with the foreign matter resulting in an abnormal displacement.

In the semiconductor dynamic quantity sensor, usually, a dedicated electrode is separately formed to give a potential to the support substrate so as to form the potential of the support substrate in order to inspect any abnormal displacement of the movable electrodes in the direction perpendicular to the surface of the substrate. In this case, the inspection is made possible by the generation of an electrostatic attractive force due to a potential differential occurring between the support substrate and the movable electrodes.

However, separately forming the dedicated electrode for giving a potential to the support substrate is cumbersome from the standpoint of production steps, and causes the constitution of the sensor to become complex.

The above problem is not specific to the semiconductor dynamic quantity sensor of the above differential capacitance type but is common to the semiconductor dynamic quantity sensors in which the peripheral fixed portion is provided on the support substrate, the movable electrodes and the fixed electrodes facing thereto are provided on the inside thereof, and the applied dynamic quantity is detected based on a change in the distances among the movable electrodes and the fixed electrodes when the dynamic quantity is applied.

SUMMARY OF THE INVENTION

In view of the above-mentioned problems, it is an object to inspect abnormal displacement of the movable electrodes in a direction perpendicular to the surface of the substrate in a semiconductor dynamic quantity sensor without requiring a dedicated electrode for giving a potential to the support substrate.

In order to achieve the above object, in a semiconductor dynamic quantity sensor comprising: a peripheral fixed portion of a semiconductor fixed and supported on a support substrate along the periphery of the support substrate; movable electrodes of a semiconductor supported on the support substrate on the inside of the peripheral fixed portion and that are displaceable in a horizontal direction relative to the surface of the substrate; and fixed electrodes of a semiconductor fixed and supported on the support substrate on the inside of the peripheral fixed portion and are opposed to the movable electrodes; a method of inspecting the semiconductor dynamic quantity sensor according to a first aspect includes detecting an applied dynamic quantity based on a change in the distances among the movable electrodes and the fixed electrodes that accompanies the displacement of the movable electrodes when the dynamic quantity is applied, featuring the following points.

That is, a potential applied to the peripheral fixed portion is varied while applying predetermined potentials to the fixed electrodes and to the movable electrodes to vary the potential difference between the movable electrodes and the support substrate and to displace the movable electrodes in a direction perpendicular to the surface of the substrate.

According to the inspection method having a feature in the above point, the potential applied to the peripheral fixed portion is simply varied while applying the predetermined potentials to the fixed electrodes and to the movable electrodes, thereby making it possible to displace the movable electrodes in the direction perpendicular to the surface of the substrate. It is therefore made possible to inspect abnormal displacement of the movable electrodes in the direction perpendicular to the surface of the substrate without requiring a dedicated electrode for forming a potential on the support substrate.

In a semiconductor dynamic quantity sensor comprising: a peripheral fixed portion of a semiconductor fixed and supported on a support substrate along the periphery of the support substrate; movable electrodes of a semiconductor supported on the support substrate on the inside of the peripheral fixed portion and that are displaceable in a horizontal direction relative to the surface of the substrate; and first fixed electrodes and second fixed electrodes of a semiconductor fixed and supported on the support substrate on the inside of the peripheral fixed portion and that are opposed to the movable electrodes maintaining detection gaps; a method of inspecting the semiconductor dynamic quantity sensor according to a second aspect includes forming a first capacitance CS1 between the movable electrodes and the first fixed electrodes, forming a second capacitance CS2 between the movable electrodes and the second fixed electrodes, and the applied dynamic quantity is detected based on a change in the differential capacitance between the first capacitance CS1 and the second capacitance CS2 that accompanies the displacement of the movable electrodes when a dynamic quantity is applied.

Here, a parasitic capacitance between the first fixed electrodes and the support substrates is denoted by CK1, a parasitic capacitance between the second fixed electrodes and the support substrate is denoted by CK2, a parasitic capacitance between the movable electrodes and the support substrate is denoted by CK3, and a parasitic capacitance between the peripheral fixed portion and the support substrate is denoted by CK4.

Then, if a potential V1 is applied to the first fixed electrodes, a potential V2 is applied to the second fixed electrodes, a potential V3 is applied to the movable electrodes, and a potential V4 is applied to the peripheral fixed portion, then, a potential V5 of the support substrate is expressed by the following numerical formula 1, $$V5=(CK1\cdot V1+CK2\ V2+CK3\cdot V3+CK4\cdot V4)/(CK1+CK2+CK3+CK4) \quad (1)$$

By utilizing the relationship of the numerical formula 1, the voltage V4 applied to the peripheral fixed portion is varied while maintaining constant the voltage V1 applied to the first fixed electrodes, the voltage V2 applied to the second fixed electrodes and the voltage V3 applied to the movable electrodes), to vary a potential difference between the movable electrodes and the support substrate to thereby displace the movable electrodes in a direction perpendicular to the surface of the substrate.

According to the inspection method having a feature in the above point, the potential applied to the peripheral fixed portion is simply varied while maintaining constant the potentials applied to the fixed electrodes and to the movable electrodes, thereby making it possible to displace the movable electrodes in the direction perpendicular to the surface of the substrate. It is therefore made possible to inspect abnormal displacement of the movable electrodes in the direction perpendicular to the surface of the substrate without requiring a dedicated electrode for forming a potential on the support substrate.

A third aspect is concerned with a method of inspecting a semiconductor dynamic quantity sensor of the first or second aspect, wherein a plurality of the movable electrodes are arranged in a comb teeth shape, and a plurality of the fixed electrodes are arranged in a comb teeth shape in mesh with the gaps of the comb teeth of the movable electrodes.

A fourth aspect is concerned with a method of inspecting a semiconductor dynamic quantity sensor of any one of the first to third aspects, wherein the support substrate, the peripheral fixed portion, the movable electrodes and the fixed electrodes are made of a silicon semiconductor.

BRIEF DESCRIPTION OF THE DRAWINGS

Other objects, features and advantages of the present invention will become more apparent from the following detailed description made with reference to the accompanying drawings, in which.

DESCRIPTION OF THE PREFERRED EMBODIMENT

A preferred embodiment will now be described with reference to the drawings in which the same or equivalent portions are denoted by the same reference numerals for easy explanation.

In this embodiment, the semiconductor dynamic quantity sensor is a differential capacitance type acceleration sensor. The semiconductor acceleration sensor can be applied, for example, to an acceleration sensor and a gyro sensor for automobiles for controlling the operations of an air bag, an ABS, a VSC, etc.

[Constitution of the Sensor]

Figure 1:
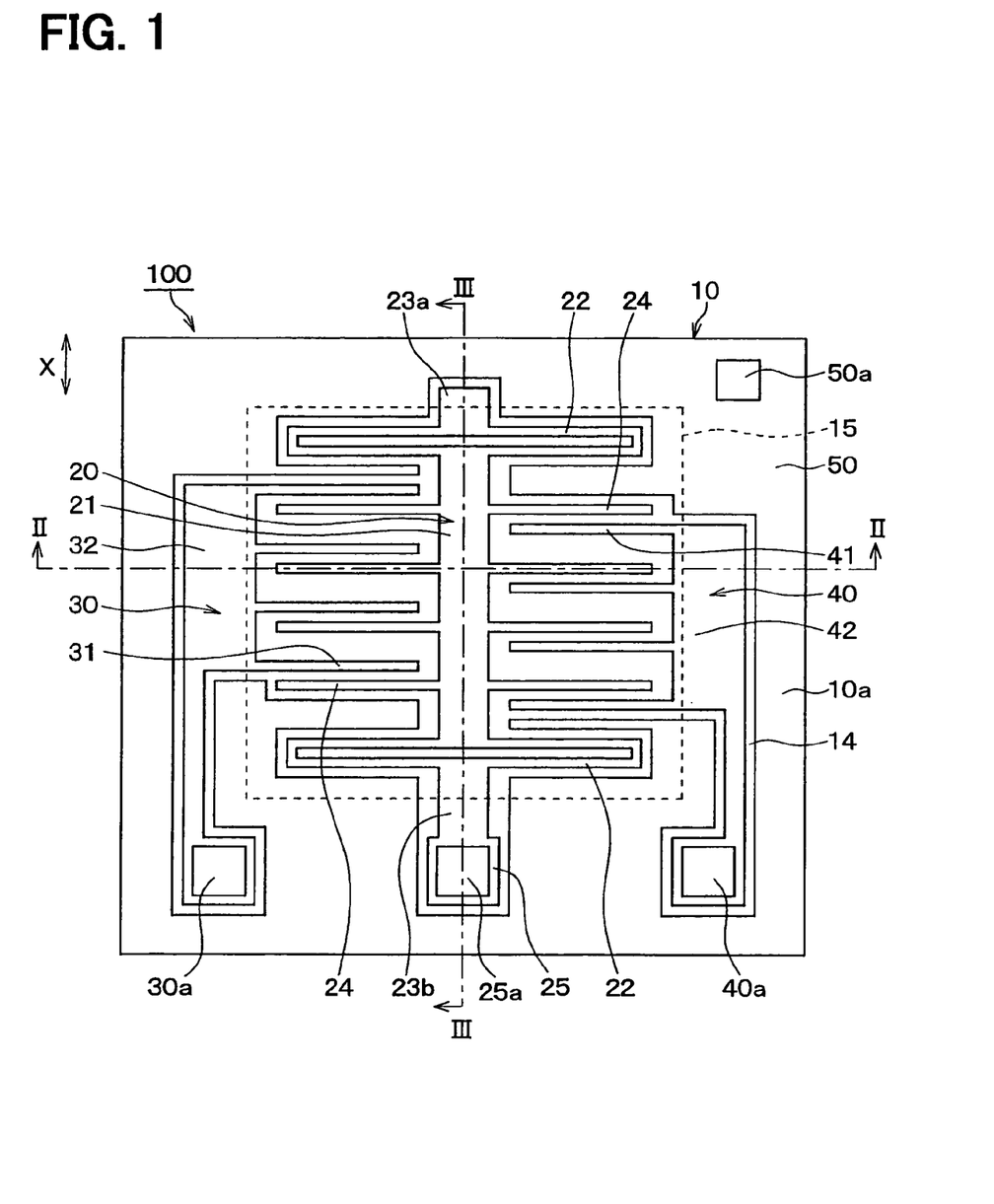
FIG. 1 is a plan view schematically illustrating the whole constitution of a semiconductor acceleration sensor according to a preferred embodiment.
Figure 2:
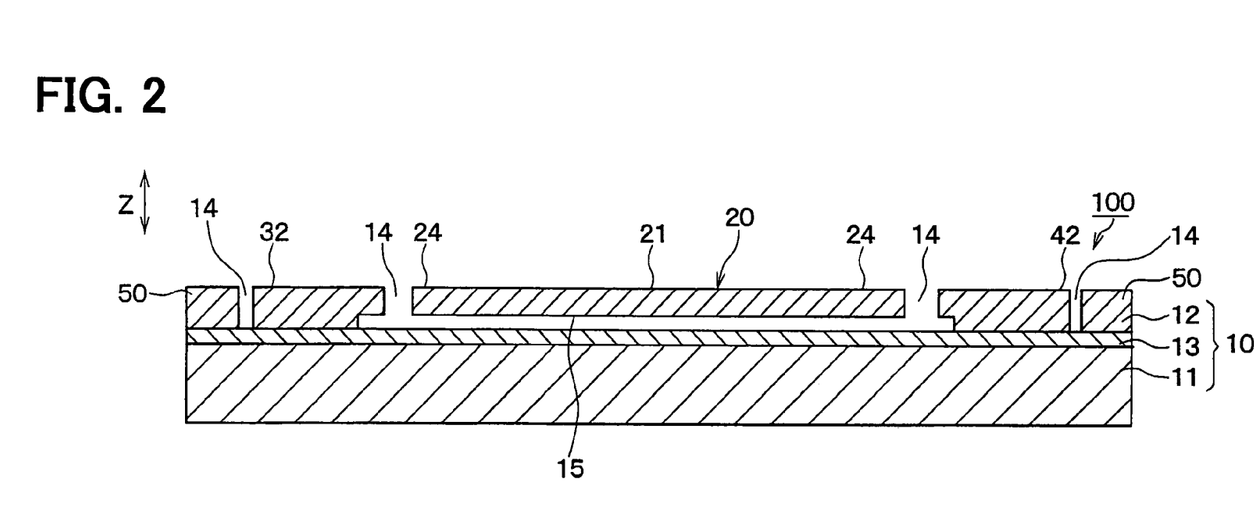
FIG. 2 is a sectional view schematically illustrating the sensor along the line II—II in FIG. 1.
Figure 3:
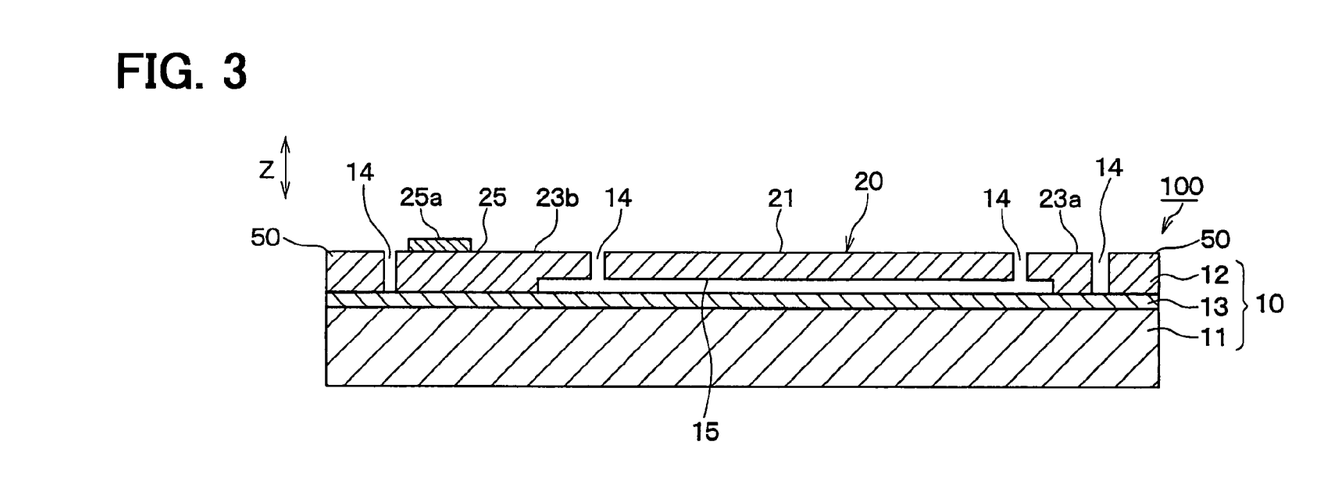
FIG. 3 is a sectional view schematically illustrating the sensor along the line III—III in FIG. 1.

FIG. 1 is a plan view schematically illustrating the whole constitution of a semiconductor acceleration sensor 100 according to a preferred embodiment. FIG. 2 is a sectional view schematically illustrating the sensor 100 along the line II—II in FIG. 1. FIG. 3 is a sectional view schematically illustrating the sensor along the line III—III in FIG. 1.

The semiconductor acceleration sensor 100 is formed by subjecting a semiconductor substrate 10 to a known micromachining.

In this embodiment as shown in FIGS. 2 and 3, the semiconductor substrate 10 constituting the semiconductor acceleration sensor 100 is an SOI substrate 10 of a rectangular shape having an oxide film 13 which is an insulating layer between a first silicon substrate 11 which is a first semiconductor layer and a second silicon substrate 12 which is a second semiconductor layer. Here, the first silicon substrate 11 is constituted as a support substrate.

Trenches 14 are formed in the second silicon substrate 12 to form a beam structure having a comb teeth shape comprising movable portions 20 and fixed portions 30, 40.

On the second silicon substrate 12, the portions corresponding to the regions forming the beam structures 20 to 40 have a decreased thickness so as to be separated away from the oxide film 13 as represented by a rectangular shape 15 indicated by a broken line in FIG. 1. The rectangular portion 15 is regarded to be the thin portion 15 of the second silicon substrate 12.

The above semiconductor acceleration sensor 100 is produced, for example, in a manner as described below. A mask of a shape corresponding to the beam structure is formed on the second silicon substrate 12 of the SOI substrate 10 relying upon a photolithography technology.

Thereafter, trench etching is performed by dry etching using such a gas as $CF_4$ or $SF_6$ to form trenches 14, to thereby form patterns of the beam structures 20 to 40 at one time.

The etching is further continued to remove the lower part of the second silicon substrate 12 by side etching, to thereby form the thin portion 15 mentioned above. Thus, the semiconductor acceleration sensor 100 is produced.

In the semiconductor acceleration sensor 100, the movable part 20, which is the thin portion 15, has both ends of a weight portion 21 of a slender rectangular shape integrally coupled to anchoring portions 23a and 23b via spring portions 22.

Referring to FIG. 3, the anchoring portions 23a and 23b are fixed to the oxide film 13, and are supported on the first silicon substrate 11 which constitutes the support substrate via the oxide film 13. Therefore, the weight portion 21 which is the thin portion 15 and the spring portions 22 are separated away from the oxide film 13.

Here, as shown in FIG. 1, the spring portions 22 have the shape of a rectangular frame with two parallel beams coupled together at both ends, and exhibit a spring function undergoing displacement in a direction at right angles with the lengthwise direction of the two beams.

Concretely speaking, upon receiving the acceleration including a component in the direction of an arrow X in FIG. 1, the spring portion 22 permits the weight portion 21 to be displaced in the direction of the arrow X which is in the horizontal direction relative to the surface of the substrate and permits the weight portion 21 to be restored to the initial state when the acceleration has dissipated.

Therefore, the moving part 20 coupled to the semiconductor substrate 10 via the spring portions 22 is allowed to displace in the direction of the arrow X which is in the horizontal direction on the surface of the substrate on the oxide film 13 or on the support substrate 11 depending upon the application of the acceleration.

As shown in FIG. 1, further, the movable portion 20 is provided with movable electrodes 24 having a comb-teeth shaped configuration as the thin portion 15. The movable electrodes 24 comprise a plurality of beams extending in the directions opposite to each other from both side surfaces of the weight portion 21 at right angles with the lengthwise direction (direction of arrow X) of the weight portion 21.

In other words, the movable electrodes 24 are arranged in the lengthwise direction of the weight portion 21 (in the direction of displacement of the spring portion 22, direction of the arrow X), and are arranged in a plural number having a comb-teeth shaped configuration along this direction of arrangement.

In FIG. 1, the movable electrodes 24 are protruded in a number of four on each side, i.e., toward the right side and left side of the weight portion 21 like beams of a rectangular shape in cross section, and are separated away from the oxide film 13.

As described above, each movable electrode 24 has beams 22 and the weight portion 21 formed integrally together, enabling both the beams 22 and the weight portion 21 to be displaced in the direction of the arrow X which is in the horizontal direction of the surface of the substrate.

As shown in FIGS. 1 to 3, further, the fixed portions 30 and 40 are fixed to the oxide film 13 on the outer side of another pair of opposing sides of the outer peripheral portions of the thin portion 15 without supporting the anchoring portions 23a, 23b. The fixed portions 30 and 40 are supported on the first silicon substrate 11 which is the support substrate via the oxide film 13.

In FIG. 1, the fixed portion 30 positioned on the left side of the weight portion 21 is constituted by the fixed electrodes 31 of the left side and a wiring portion 32 for the fixed electrodes of the left side. In FIG. 1, further, the fixed portion 40 positioned on the right side of the weight portion 21 is constituted by the fixed electrodes 41 of the right side and a wiring portion 42 for the fixed electrodes of the right side.

In this embodiment as shown in FIG. 1, the fixed electrodes 31 and 41 forming the thin portion 15 are arranged in a plural number having a comb-teeth configuration so as to be in mesh with the gaps of the comb-teeth configuration of the movable electrodes 24.

Here, in FIG. 1, on the left side of the weight portion 21, there are provided the left-side fixed electrodes 31 on the upper side of the individual movable electrodes 24 along the direction of the arrow X. On the right side of the weight portion 21, on the other hand, there are provided the right-side fixed electrodes 41 on the lower side of the individual movable electrodes 24 along the direction of the arrow X.

The fixed electrodes 31, 41 are arranged to be opposed to the individual movable electrodes 24 in the horizontal direction of the surface of the substrate, and detection gaps are formed between the side surfaces (detection surfaces) of the movable electrodes 24 and the side surfaces (detection surfaces) of the fixed electrodes 31, 41 for detecting capacitances.

The left-side electrodes 31 and the right-side electrodes 41 are electrically independent from each other. The fixed electrodes 31 and 41 are formed like beams of a rectangular shape in cross section extending nearly in parallel with the movable electrodes 24.

Here, the left-side fixed electrodes 31 and the right-side fixed electrodes 41 are cantilevered by the wiring portions 32, 42 for fixed electrodes that are fixed by the support substrate 11 via the oxide film 13. The fixed electrodes 31 and 41 are in a state of being separated away from the oxide film 13.

Thus, the left-side fixed electrodes 31 and the right-side fixed electrodes 41 are in such a form that a plurality of electrodes are grouped for the wiring portions 32 and 42 which are electrically in common.

Referring to FIG. 1, further, on the second silicon substrate 12 of the semiconductor substrate 10, the outer peripheral portions of the movable electrode 24 and of the fixed electrodes 31, 41 partitioned by the trench 14, form the peripheral fixed portion 50.

The peripheral fixed portion 50 is fixed and supported on the first silicon substrate 11 which is the support substrate via the oxide film 13 along the peripheral portions of the first silicon substrate 11.

Pads 30a for the left-side fixed electrodes and pads 40a for the right-side fixed electrodes are formed at predetermined positions on the wiring portion 32 for the left-side fixed electrodes and on the wiring portion 42 for the right-side fixed electrodes.

Further, a wiring portion 25 for movable electrodes is formed in a state of being integrally coupled to the one anchoring portion 23b, and a pad 25a for movable electrodes is formed at a predetermined position on the wiring portion 25. Further, a pad 50a for a peripheral fixed portion is formed at a predetermined position of the peripheral fixed portion 50.

The pads 25a, 30a, 40a and 50a for electrodes are formed by, for example, sputtering or vacuum-evaporating aluminum. The pads 25a, 30a, 40a and 50a for electrodes are electrically connected to a circuit chip (shown later) through bonding wires.

The circuit chip may include a detection circuit (see FIG. 4 appearing later) for processing output signals from the semiconductor acceleration sensor 100 and a circuit for inspection.

[Detection Operation of the Sensor]

Next, described below is the detecting operation of the semiconductor acceleration sensor 100. In this embodiment, the acceleration is detected based on a change in the capacitances among the movable electrodes 24 and the fixed electrodes 31, 41 accompanying the application of the acceleration.

In the semiconductor acceleration sensor 100 as described above, the side surfaces (detection surfaces) of the fixed electrodes 31, 41 are opposed to the side surfaces (detection surfaces) of the movable electrodes 24, and detection gaps for detecting the capacitances are formed by the gaps to the side surfaces of the electrodes 31, 41.

Here, it is presumed that the first capacitance CS1 which is a detection capacitance is formed in the gap between the left-side fixed electrodes 31 and the movable electrodes 24, and the second capacitance CS2 which is a detection capacitance is formed in the gap between the right-side fixed electrodes 41 and the movable electrodes 24.

If an acceleration is applied in the direction of the arrow X in the drawing in the horizontal direction of the surface of the substrate, the whole movable portion 20, except the anchoring portions, undergo the displacement in the direction of the arrow X due to the spring function of the spring portions 22, whereby the capacitances CS1 and CS2 vary depending upon the displacement of the movable electrodes 24 in the direction of the arrow X.

In FIG. 1, for example, it is presumed that the movable portion 20 has been displaced downward along the direction of the arrow X. In this case, the gap is widened between the left-side fixed electrodes 31 and the movable electrodes 24, while the gap is narrowed between the right-side fixed electrodes 41 and the movable electrodes 24.

It is therefore allowed to detect the acceleration in the direction of the arrow X based on a change in the differential capacitance (CS1−CS2) by the movable electrodes 24 and the fixed electrodes 31, 41.

Concretely speaking, a signal based on the difference (CS1−CS2) in the capacitance is output as an output signal from the semiconductor acceleration sensor 100, is processed by the above circuit chip, and is finally output.

Figure 4:
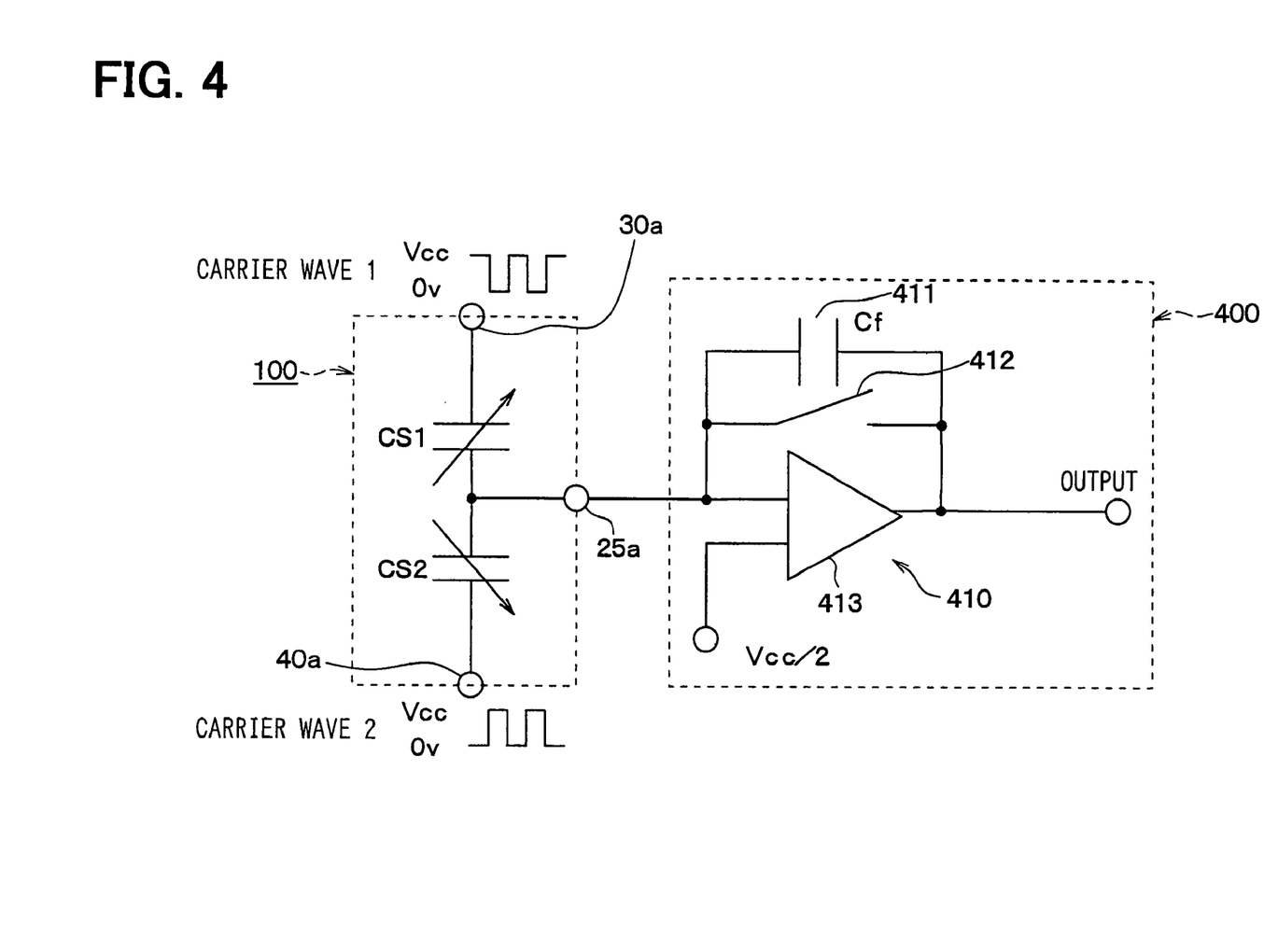
FIG. 4 is a circuit diagram illustrating a detector circuit for detecting the acceleration in the semiconductor acceleration sensor shown in FIG. 1.

FIG. 4 is a circuit diagram illustrating a detection circuit 400 for detecting the acceleration in the semiconductor acceleration sensor 100.

In the detection circuit 400, a switched capacitor circuit (SC circuit) 410 includes a capacitor 411 having a capacitance Cf, a switch 412 and a differential amplifier circuit 413, and converts a difference in the capacitance (CS1−CS2) that is output as a voltage.

In this semiconductor acceleration sensor 100, for example, carrier waves 1 of an amplitude Vcc are input from the pad 30a for the left-side fixed electrodes, carrier waves 2 having a phase deviated by 180° from the carrier waves 1 are input from the pad 40a for the right-side fixed electrodes, and the switch 412 of the SC circuit 410 is opened and closed at predetermined timings.

The applied acceleration in the direction of the arrow X is output as a voltage V0 as expressed by the following numerical formula 2, $$V0=(CS1-CS2)\cdot Vcc/Cf \qquad (2)$$

Thus, the acceleration is detected. At the time of detecting the acceleration, the peripheral fixed portion 50 is in a state of reference potential, i.e., 0 V.

[Method of Inspecting the Sensor]

In the semiconductor acceleration sensor 100 which has the basic constitution and operates as described above, it is necessary to inspect any abnormal displacement of the movable electrodes 24 in the direction perpendicular to the surface of the substrate accompanying the application of acceleration. Here, the direction perpendicular to the surface of the substrate is denoted by an arrow Z in FIGS. 2 and 3.

Figure 5A:
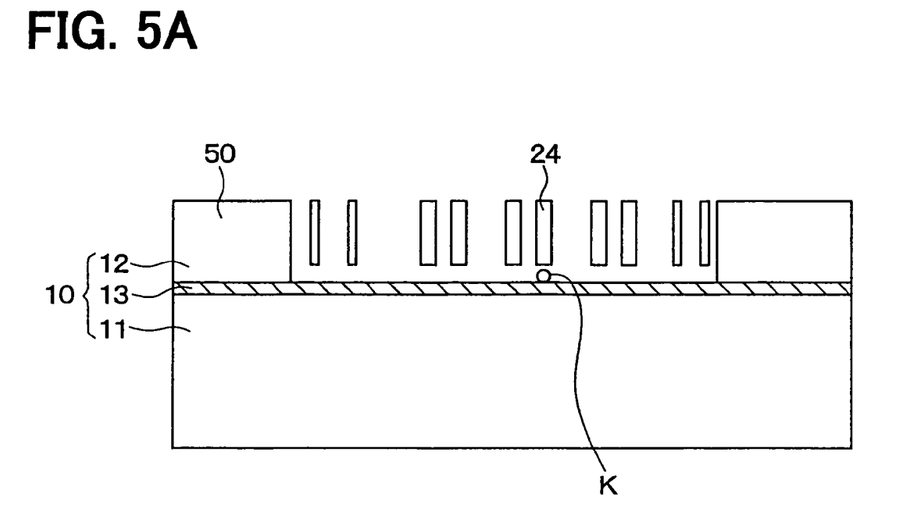
FIGS. 5A–5B are views illustrating the inspection of abnormal displacement of the movable electrodes in a direction of an arrow Z.
Figure 5B:
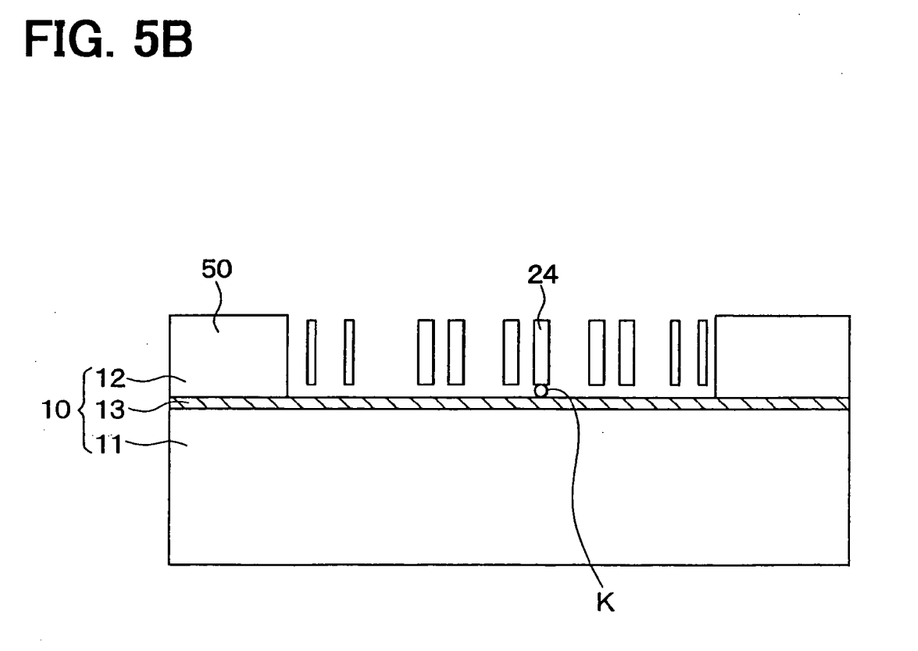

FIGS. 5A–5B are views illustrating an inspection of abnormal displacement of the movable electrodes 24 in a direction of the arrow Z. Referring to FIG. 5A, considered below is a case where a foreign matter K exists between the movable electrodes 24 and the first silicon substrate 11 which is the support substrate.

In this case, the movable electrodes 24 undergo displacement in the direction of the arrow Z due to the application of acceleration and may come into contact with the foreign matter K as shown in FIG. 5B, and the potential of the movable electrodes 24 becomes abnormal, thereby distorting the sensor characteristics.

In this embodiment, therefore, attention is given to the parasitic capacitances existing between the electrodes 24, 31, 41 and the first silicon substrate 11, and the potential applied to the peripheral fixed portion 50 is varied while maintaining constant the potentials of the fixed electrodes 31, 41 and of the movable electrodes 24, to thereby vary the potential formed on the first silicon substrate 11 which is the support substrate.

Therefore, the potential difference can be varied between the movable electrodes 24 and the first silicon substrate 11, which is the support substrate, and the movable electrodes 24 can be displaced in the direction of the arrow Z which is perpendicular to the surface of the substrate. This inspection method will now be concretely described with reference to FIGS. 6A–6B.

Figure 6A:
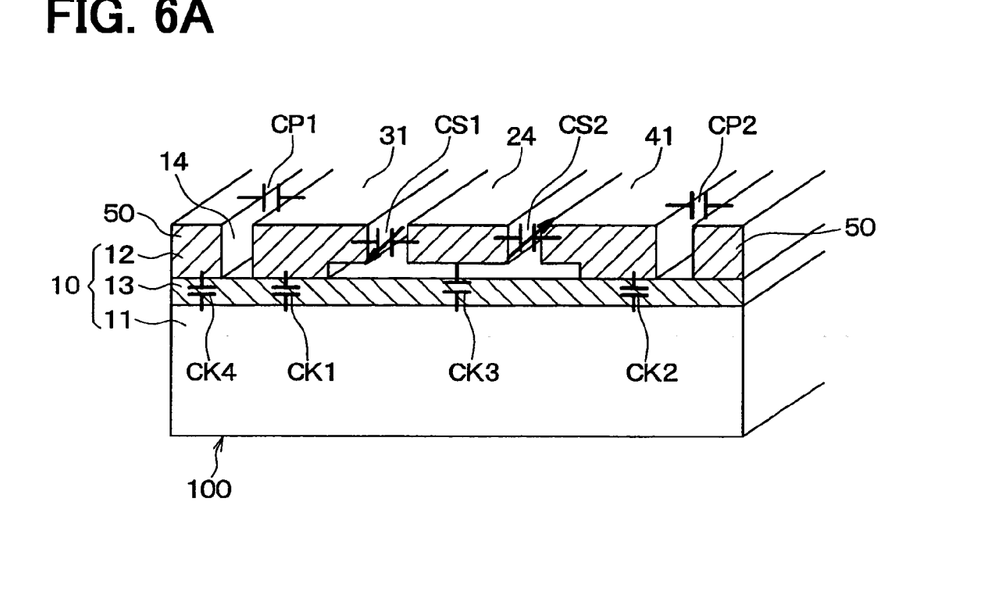
FIG. 6A is a view illustrating the capacitances among various portions in the sensor shown in FIG. 1.
Figure 6B:
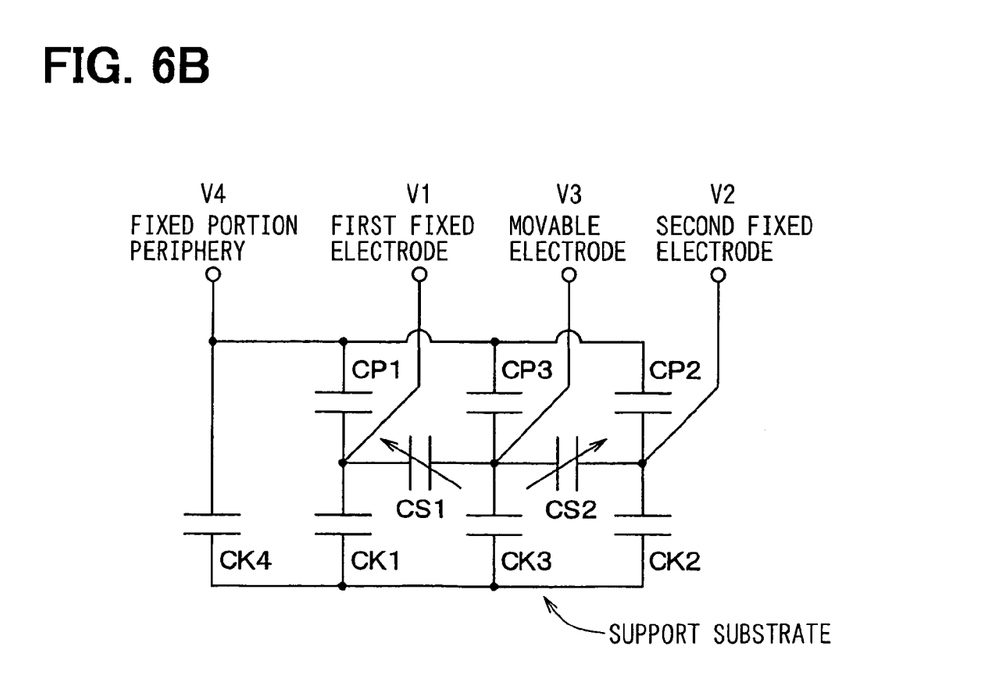
FIG. 6B is a circuit diagram illustrating a relationship among the capacitances shown in FIG. 6A.

In the semiconductor acceleration sensor 100, various capacitances are formed among various portions. FIG. 6A is a view illustrating capacitances among various portions of the sensor 100, and FIG. 6B is a circuit diagram illustrating a relationship of the capacitances shown in FIG. 6A.

Referring to FIG. 6A, as described above, there are formed, as detection capacitances, a first capacitance CS1 between the movable electrodes 24 and the first fixed electrodes 31, and a second capacitance CS2 between the movable electrodes 24 and the second fixed electrodes 41.

Further, a parasitic capacitance CK1 is formed between the first fixed electrodes 31 and the first silicon substrate 11 via the oxide film 13, a parasitic capacitance CK2 is formed between the second fixed electrodes 41 and the first silicon substrate 11 via the oxide film 13, a parasitic capacitance CK3 is formed between the movable electrodes 24 and the first silicon substrate 11 via the oxide film 13, a parasitic capacitance CK4 is formed between the peripheral fixed portion 50 and the first silicon substrate 11 via the oxide film 13.

Further, a parasitic capacitance CP1 is formed between the first fixed electrodes 31 and the peripheral fixed portion 50 via the trench 14, a parasitic capacitance CP2 is formed between the second fixed electrodes 41 and the peripheral fixed portion 50 via the trench 14 and, though not shown in FIG. 6A, a parasitic capacitance CP3 is formed between the movable electrodes 24 and the peripheral fixed portion 50 via the trench 14.

Here, the relationship among the capacitances is illustrated in FIG. 6B, wherein a potential V1 is applied to the first fixed electrodes 31, a potential V2 is applied to the second fixed electrodes 41, a potential V3 is applied to the movable electrodes 24, and a potential V4 is applied to the peripheral fixed portion 50. These potentials V1 to V4 are applied from the inspection circuit in the above circuit chip through the pads 25a, 31a, 41a and 50a.

When the potentials V1, V2, V3 and V4 are thus applied, a potential V5 of the first silicon substrate (support substrate) 11 is expressed by the following numerical formula 3 based on a relationship between the electric charge Q and the capacitance C, $$V5=Q/C=(CK1\cdot V1+CK2\cdot V2+CK3\cdot V3+CK4\ V4)/(CK1+CK2+CK3+CK4) \quad (3)$$

In this state, the potential V4 applied to the peripheral fixed portion 50 is varied while maintaining constant the voltage V1 applied to the first fixed electrodes 31, the voltage V2 applied to the second fixed electrodes 41, and the voltage V3 applied to the movable electrodes 24 by utilizing a relationship of the numerical formula 3.

Therefore, the potential V5 formed on the first silicon substrate 11 varies depending upon the above numerical formula 3, and a potential difference between the movable electrodes 24 and the first silicon substrate 11 (difference between V2 and V5) varies, too. Then, the movable electrodes 24 are permitted to be suitably displaced in a direction (arrow Z) perpendicular to the surface of the substrate.

Figure 7:
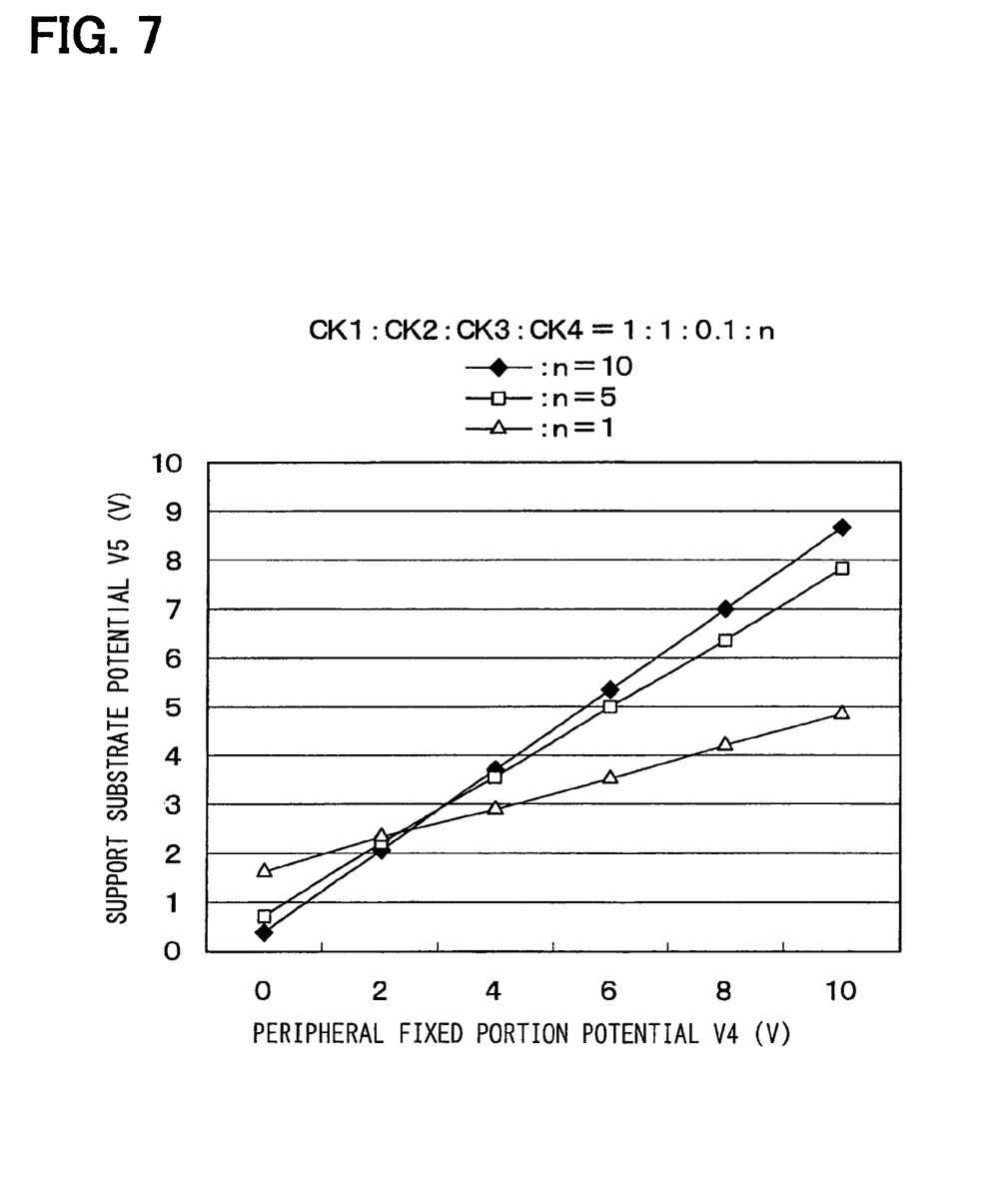
FIG. 7 is a diagram illustrating changes in the potential V5 formed on a support substrate.

For illustrative purposes only and not for imposing any limitation upon the preferred embodiment, FIG. 7 illustrates changes in the potential V5 formed on the first silicon substrate (support substrate) 11.

FIG. 7 illustrates a relationship between the potential V4 of the peripheral fixed portion 50 and the potential V5 of the first silicon substrate (support substrate) 11 of when CK1 to CK4 have a relationship CK1:CK2:CK3:CK4=1:1:0.1:n (n is a variable of 1 to 10).

In FIG. 7, the potential V4 applied to the peripheral fixed portion 50 is varied while maintaining the voltage V1 applied to the first fixed electrodes 31 to be 5V, the voltage V2 applied to the second fixed electrodes 41 to be 2V, and the voltage V3 applied to the movable electrodes 24 to be 2.5V. In FIG. 7, a case when n=1 is plotted by open triangles, a case when n=5 is plotted by open squares, and a case when n=10 is plotted by black rhombi.

As shown in FIG. 7, the potential V5 formed on the first silicon substrate 11 is varied by varying the potential V4 of the peripheral fixed portion 50. By utilizing the above relationship, the potential difference is varied between the movable electrodes 24 and the support substrate 11 to perform the inspection in the direction of the arrow Z.

[Effect]

According to this embodiment as described above, there is provided a method of inspecting a semiconductor dynamic quantity sensor comprising: a peripheral fixed portion 50 of a semiconductor fixed and supported on a support substrate 11 along the periphery of the support substrate 11; movable electrodes 24 of a semiconductor supported on the support substrate 11 on the inside of the peripheral fixed portion 50 and that are displaceable in a horizontal direction relative to the surface of the substrate; and fixed electrodes 31, 41 of a semiconductor fixed and supported on the support substrate 11 on the inside of the peripheral fixed portion 50 and are opposed to the movable electrodes 24; thereby to detect an applied acceleration based on a change in the distances among the movable electrodes 24 and the fixed electrodes 31, 41 that accompanies the displacement of the movable electrodes 24 when the acceleration is applied, featuring the following points.

That is, a potential applied to the peripheral fixed portion 50 is varied while applying predetermined potentials to the fixed electrodes 31, 41 and to the movable electrodes 24 to vary the potential difference between the movable electrodes 24 and the support substrate 11 and to displace the movable electrodes 24 in a direction perpendicular to the surface of the substrate.

According to the inspection method having a feature in the above point, the potential applied to the peripheral fixed portion 50 is simply varied while applying the predetermined potentials to the fixed electrodes 31, 41 and to the movable electrodes 24 making it possible to displace the movable electrodes 24 in the direction perpendicular to the surface of the substrate. It is therefore made possible to inspect abnormal displacement of the movable electrodes 24 in the direction perpendicular to the surface of the substrate without requiring a dedicated electrode for forming a potential on the support substrate 11.

In particular, the embodiment provides a method of inspecting a semiconductor acceleration sensor 100 which comprises a peripheral fixed portion 50, movable electrodes 24, first fixed electrodes 31 and second fixed electrodes 41 on the support substrate 11, and detects an applied acceleration based on a change in the differential capacitance between the first capacitance CS1 and the second capacitance CS2 that accompanies the displacement of the movable electrodes 24 when the acceleration is applied, the method of inspection having a feature in the following point.

That is, the potential V4 applied to the peripheral fixed portion 50 is varied while maintaining constant the voltage V1 applied to the first fixed electrodes 31, the voltage V2 applied to the second fixed electrodes 41, and the voltage V3 applied to the movable electrodes 24 by utilizing the relationship expressed by the above numerical formula 3, to vary the potential difference between the movable electrodes 24 and the support substrate 11 and to displace the movable electrodes 24 in a direction perpendicular to the surface of the substrate.

Namely, this embodiment provides a method of inspecting a semiconductor dynamic quantity sensor of the differential capacitance type capable of inspecting abnormal displacement of the movable electrodes 24 in the direction perpendicular to the surface of the substrate without requiring a dedicated electrode for forming a potential on the support substrate 11.

(Other Embodiments)

In the semiconductor acceleration sensor 100 of the above embodiment, the movable electrodes 24 are arranged in a plural number like comb teeth, and the fixed electrodes 31, 41 are arranged in a plural number having a comb-teeth configuration in mesh with the gaps of the comb teeth of the movable electrodes 24, but these electrodes are not limited to the constructions.

In addition to the above acceleration sensor, the above embodiment can be further applied to a semiconductor dynamic quantity sensor such as an angular velocity sensor that detects the angular velocity as the dynamic quantity.

In short, the preferred embodiment provides a method of inspecting a semiconductor dynamic quantity sensor which comprises a peripheral fixed portion, movable electrodes and fixed electrodes on the support substrate, and detects an applied dynamic quantity based on a change in the distances among the movable electrodes and the fixed electrodes that accompanies the displacement of the movable electrodes when the dynamic quantity is applied, the method of inspection having a feature as described above. Other details can be suitably designed and altered.

In producing the semiconductor dynamic quantity sensors, the method of inspection is preferably used as a step of inspection in the steps of production. In this case, the method of inspection can be specified as a method of producing a semiconductor dynamic quantity sensor.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of inspecting a semiconductor dynamic quantity sensor comprising:

a peripheral fixed portion of a semiconductor fixed and supported on a support substrate along the periphery of the support substrate;

movable electrodes of a semiconductor supported on the support substrate on the inside of the peripheral fixed portion and displaceable in a horizontal direction relative to the surface of the substrate; and first fixed electrodes and second fixed electrodes of a semiconductor fixed and supported on the support substrate on the inside of the peripheral fixed portion and that are opposed to the movable electrodes maintaining detection gaps;

wherein a first capacitance is formed between the movable electrodes and the first fixed electrodes, a second capacitance is formed between the movable electrodes and the second fixed electrodes;

wherein the applied dynamic quantity is detected based on a change in the differential capacitance between the first capacitance and the second capacitance that accompanies the displacement of the movable electrodes when a dynamic quantity is applied; the method comprising:

applying a potential (V1) to the first fixed electrodes, a potential (V2) is to the second fixed electrodes, a potential (V3) to the movable electrodes, and a potential (V4) to the peripheral fixed portion, and whereby a potential (V5) of the support substrate is expressed by the following numerical formula 1, $$V5 = (CK1 \cdot V1 + CK2 \cdot V2 + CK3 \cdot V3 + CK4 \cdot V4)/(CK1 + CK2 + CK3 + CK4) \quad (1)$$

wherein (CK1) denotes a parasitic capacitance between the first fixed electrodes and the support substrates, (CK2) denotes a parasitic capacitance between the second fixed electrodes and the support substrate, (CK3) denotes a parasitic capacitance between the movable electrodes and the support substrate, and (CK4) denotes a parasitic capacitance between the peripheral fixed portion and the support substrate, and by utilizing the relationship of the numerical formula 1, the voltage (V4) applied to the peripheral fixed portion is varied while maintaining constant the voltage (V1) applied to the first fixed electrodes, the voltage (V2) applied to the second fixed electrodes and the voltage (V3) applied to the movable electrodes, to vary a potential difference between the movable electrodes and the support substrate to thereby displace the movable electrodes in a direction perpendicular to the surface of the substrate.

2. A method of inspecting a semiconductor dynamic quantity sensor according to claim 1, further comprising arranging the movable electrodes in a plural number in a comb-teeth shaped configuration, and the fixed electrodes in a plural number in a comb-teeth shaped configuration in mesh with gaps of the comb-teeth shaped configuration of the movable electrodes.

3. A method of inspecting a semiconductor dynamic quantity sensor according to claim 1, wherein the support substrate, the peripheral fixed portion, the movable electrodes and the fixed electrodes are made of a silicon semiconductor.

* * * * *